United States Patent
Cahill (10) Patent No.: US 8,838,986 B2
(45) Date of Patent: *Sep. 16, 2014

(54) INVOCATION OF THIRD PARTY'S SERVICE

(75) Inventor: Conor P. Cahill, Waterford, VA (US)

(73) Assignee: Google Inc., Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/243,790

(22) Filed: Sep. 23, 2011

(65) Prior Publication Data

US 2012/0017269 A1    Jan. 19, 2012

Related U.S. Application Data

(63) Continuation of application No. 11/347,573, filed on Feb. 6, 2006, now Pat. No. 8,028,325.

(60) Provisional application No. 60/706,039, filed on Aug. 8, 2005.

(51) Int. Cl.
*H04L 29/06* (2006.01)
*G06Q 10/10* (2012.01)
*G06Q 20/36* (2012.01)

(52) U.S. Cl.
CPC .............. *G06Q 10/10* (2013.01); *G06Q 20/367* (2013.01)
USPC ................... 713/182; 726/2; 726/20; 726/27; 713/172

(58) Field of Classification Search
CPC .................................................... G06Q 20/367
USPC .............................................. 726/2; 713/182
See application file for complete search history.

(56) References Cited

U.S. PATENT DOCUMENTS

| 5,794,210 | A | 8/1998 | Goldhaber et al. | |
|---|---|---|---|---|
| 5,872,847 | A * | 2/1999 | Boyle et al. | 713/151 |
| 6,253,325 | B1 | 6/2001 | Steele et al. | |
| 6,282,649 | B1 * | 8/2001 | Lambert et al. | 713/167 |
| 6,704,768 | B1 | 3/2004 | Zombek et al. | |
| 6,807,636 | B2 | 10/2004 | Hartman et al. | |
| 7,054,830 | B1 | 5/2006 | Eggleston et al. | |
| 7,089,208 | B1 | 8/2006 | Levchin et al. | |
| 7,246,164 | B2 | 7/2007 | Lehmann et al. | |
| 7,448,075 | B2 | 11/2008 | Morand et al. | |
| 7,516,321 | B2 * | 4/2009 | Chen et al. | 713/155 |
| 7,765,298 | B2 * | 7/2010 | Villavicencio | 709/225 |
| 2003/0236977 | A1 | 12/2003 | Levas et al. | |

(Continued)

OTHER PUBLICATIONS

Wang, Jun, Vecchio, David Del, "Extending the Security Assertion Markup Language to Support Delegation for Web Services and Grid Services", Jul. 11-15, 2005, ICWS'05 vol. 1, pp. 67-74.*

(Continued)

*Primary Examiner* — Mohammad L Rahman
(74) *Attorney, Agent, or Firm* — Fox Rothschild LLP (57) ABSTRACT

Invoking a computer implemented service includes receiving a request from a first user to access a service associated with a second user. The request is associated with a security token for the first user and an identity token for the second user. The acceptability of the security token is determined to authenticate the first user, and the acceptability of the identity token is determined to securely identify the second user. The first user is able to access the service associated with the second user conditioned on the security token being determined to be acceptable and the identity token being determined to be acceptable.

18 Claims, 5 Drawing Sheets

(56) References Cited

U.S. PATENT DOCUMENTS

| | | |
|---|---|---|
| 2004/0210770 A1 | 10/2004 | Sanin et al. |
| 2005/0081063 A1 | 4/2005 | Patrick et al. |
| 2005/0174988 A1 | 8/2005 | Bieber et al. |
| 2005/0198305 A1 | 9/2005 | Pezaris et al. |
| 2006/0107286 A1 | 5/2006 | Connor et al. |
| 2006/0190410 A1 | 8/2006 | Harper |
| 2006/0256008 A1* | 11/2006 | Rosenberg .................. 342/367 |
| 2007/0277231 A1* | 11/2007 | Medvinsky et al. ............. 726/5 |
| 2008/0015998 A1 | 1/2008 | Celik |

OTHER PUBLICATIONS

Gomi et al., "A Delegation Framework for Federated Identity Management", Nov. 11, 2005, pp. 94-103.*

Web Services Security: SAML Token Profile, Working Draft 06, Feb. 21, 2003.

"Speaking Saml"—Oct. 30, 2003, by Lori MacVittie (http://www.networkcomputing.com/article/printFullArticleSrc.jhtml?articleID=15500584).

* cited by examiner

INVOCATION OF THIRD PARTY'S SERVICE

This is a continuation of application Ser. No. 11/347,573, filed Feb. 6, 2006, now U.S. Pat. No. 8,028,325 which is incorporated herein by reference.

CROSS-REFERENCE TO RELATED APPLICATIONS

This application claims priority to U.S. Provisional Application No. 60/706,039, filed on Aug. 8, 2005, and titled "INVOCATION OF A THIRD PARTY'S SERVICE."

TECHNICAL FIELD

This description relates to a system that enables a user to privately and securely access and invoke a third party user's electronic service or computer-implemented service.

BACKGROUND

The rise of the Internet has led to the development of a vast number and variety of electronic services, including Web services that help users communicate with each other, better organize their lives, access and store electronic information, and improve work productivity. Web services accessible across the Internet include communications services (e.g., e-mail and instant messaging services), services that enhance personal organization and time management (e.g., calendar services and address book services), financial services (e.g., online banking and online investing services) and business specific services (e.g., a document organization and management services tailored to a specific company).

When a user wishes to access an electronic service, the user typically sends a service request to a provider of the electronic service. The electronic service provider receives the service request, authenticates the user (i.e., determines that the user is, in fact, who he or she purports to be), and determines whether the user is authorized to access or invoke the requested electronic service. If the user is so authorized, the electronic service provider enables the user to access the requested service.

SUMMARY

In one general aspect, invoking a computer implemented service includes receiving a request from a first user to access a service associated with a second user. The request is associated with a security token for the first user and an identity token for the second user. The acceptability of the security token is determined to authenticate the first user, and the acceptability of the identity token is determined to securely identify the second user. The first user is able to access the service associated with the second user conditioned on the security token being determined to be acceptable and the identity token being determined to be acceptable.

Implementations may include one or more of the following features. For example, receiving a request from a user to invoke a service associated with a second user may include receiving a request from a first user to invoke a service for which the second user is a registered user. Receiving a request from a user to invoke a service associated with a second user also may include receiving a request from a first user to invoke a service for which the second user is a registered user and the first user is not a registered user.

Receiving a request from a first user may include receiving a message from the first user that includes a header portion having the identity token. The header portion may additionally include the security token or a pointer to the security token. The security token or the pointer to the security token may be contained in a security context in the header portion. The security context may include a Web Services Security (WS-Security) context. The security context may additionally include one or more rules or conditions for permissible use of the security token. The header portion may include a container configured to contain the identity token. The container may be distinct from the security context.

The security token may include a Security Assertions Mark-up Language (SAML) assertion for a SAML authentication assertion. The identity token may include a SAML assertion.

Determining the acceptability of the security token to authenticate the first user may include determining that the security token is used by the first user in accordance with one or more permissible use requirements. The permissible use requirements may include one or more of: a requirement that the security token be received during a predetermined time period, a requirement that the security token be sent to an authorized recipient, and a requirement that the security token be received from an authorized sender.

Determining the acceptability of the identity token to securely identify the second user may include determining that the identity token is valid. Determining that the identity token is valid may include determining that the identity token is signed by a trusted issuing authority. Determining the acceptability of the identity token to securely identify the second user may include determining that the identity token is used by the first user in accordance with one or more permissible use requirements. The permissible use requirements may include one or more of: a requirement that the identity token be received during a predetermined time period, a requirement that the identity token be sent to an authorized recipient, and a requirement that the identity token be received from an authorized sender.

Invoking a computer implemented service may further include determining whether the first user is authorized to access the service associated with the second user. Enabling the first user to access the service associated with the second user may be further conditioned on the first user being authorized to access the service associated with the second user.

Determining whether the first user is authorized to access the service associated with the second user may include accessing a set of preferences associated with the second user to determine whether to authorize the first user to access the service. The service may include a group of service features, and enabling the first user to access the service may include enabling the first user to access only a subset of the group of service features conditioned on the set of preferences including a preference to limit the access of the first user to the subset of service features. The subset of service features may include a subset of service features specified by the second user.

The service may include an image storage service and the subset of service features may include service features related to viewing images stored by the second user and may exclude service features related to one or more of: deleting images, adding images, and changing the organization of image storage. The service may include an address book or calendar service and the subset of service features may include service features related to viewing all or selected calendar entries or address book entries and may exclude service features related to one or more of: adding calendar or address book entries, deleting calendar or address book entries, and editing calendar or address book entries.

The set of preferences may include a time limit or window of time during which the first user is authorized to access the service. The set of preferences may deny authorization to the first user if more than a predetermined number of requests by the first user to invoke the second user's service were received from the first user in the past. The service may comprise a pay-per-view service and the set of preferences may deny authorization of the first user if more than a predetermined number of requests to watch a video were received from the first user in the past. The predetermined number of requests may be specified by the second user.

The details of one or more implementations are set forth in the accompanying drawings and the description below. Other features will be apparent from the description and drawings, and from the claims.

DETAILED DESCRIPTION

In one particular implementation, a first user is provided with access to an electronic service associated with a second user by sending to the provider of the electronic service a service request that includes a security token for the first user and an identity token for the second user. The electronic service provider examines the security token to authenticate the first user and examines the identity token to securely identify the second user. If one or both of the tokens are determined to be unacceptable (i.e., one or both of the tokens are determined to be invalid or are determined to not meet a set of permissible use conditions), the electronic service provider denies the service request. If, however, both the security token and the identity token are determined to be acceptable, the electronic service provider deems the service request authentic and then determines whether the second user is associated with the electronic service by, for example, being a subscriber to the electronic service, being registered with the electronic service, and/or being otherwise included in a list of users authorized to independently access the electronic service (i.e., authorized to access his or her own resources at the electronic service rather than only authorized to access the resources of another user at the electronic service).

If the second user is not associated with the electronic service, the service request is denied. If the second user is associated with the electronic service, the electronic service provider determines whether the first user has been authorized by the second user to access the electronic service. If the first user has been so authorized, the first user is granted access to the electronic service. If the first user has not been authorized, the first user is denied access to the electronic service.

An electronic service is a computer implemented service that executes operations to process and/or provide access to data in response to an authorized service request. Electronic services may include, but are not limited to, one or more of the following: (1) communications services that enable electronic communications between users (e.g., e-mail services, instant messaging services, text messaging services, bulletin boards, and forums); (2) content provisioning services that provide electronic content to authorized users (e.g., a magazine or newspaper web-sites, pay-per-view video services, audio services, and document provisioning services); (3) data storage services (i.e., services that enable a user to store video, text, and/or audio data online); (4) time management and scheduling services (e.g., calendar services and address book services); (5) financial services (e.g., online banking, online investing, financial planning services, and credit card services); (6) data processing services (e.g., electronic search services); (7) e-commerce services (i.e., electronic services that enable a user to purchase goods and/or services online); and (8) business-specific services (e.g., services offered by or accessible through a company's intranet).

An electronic service includes one or more service features or resources. A service feature may include a specific task that may be carried out by the electronic service and/or a specific set of data that may be accessible through the electronic service. A second user associated with an electronic service may authorize a first user to access one or more of the service features offered by the electronic service in accordance with a set of preferences. The preferences may, for example, specify the service feature(s) that the second user authorizes the first user to access, may specify a time limit or window of time during which the first user may access the service feature (s), and/or may specify a discrete number of service requests that the second user authorizes the first user to submit. The preferences may be globally defined for all first users or may vary depending on the identity of the first user.

For example, if the electronic service is an image storage service, the second user may grant the first user access to service features related to viewing images stored by the second user but not to service features related to deleting images, adding images, and/or changing the way the images are organized in storage (e.g., changing the make-up of online photo albums). If the electronic service is an address book or calendar service, the second user may grant the first user access to service features related to viewing all or selected entries of the second user's calendar or address book, but may deny the first user access to service features related to adding or modifying the second user's calendar or address book entries.

Other examples in which a first user may be advantageously granted access to an electronic service associated with a second user include: a parent being granted access to an electronic service associated with a child to enable parental controls (e.g., a parent may control a child's instant messaging settings); a first user being authorized to purchase a number of videos from a second user's pay-per-view service as a gift from the second user to the first user; and a customer service representative being authorized to access a customer's account for customer care purposes.

Figure 1:
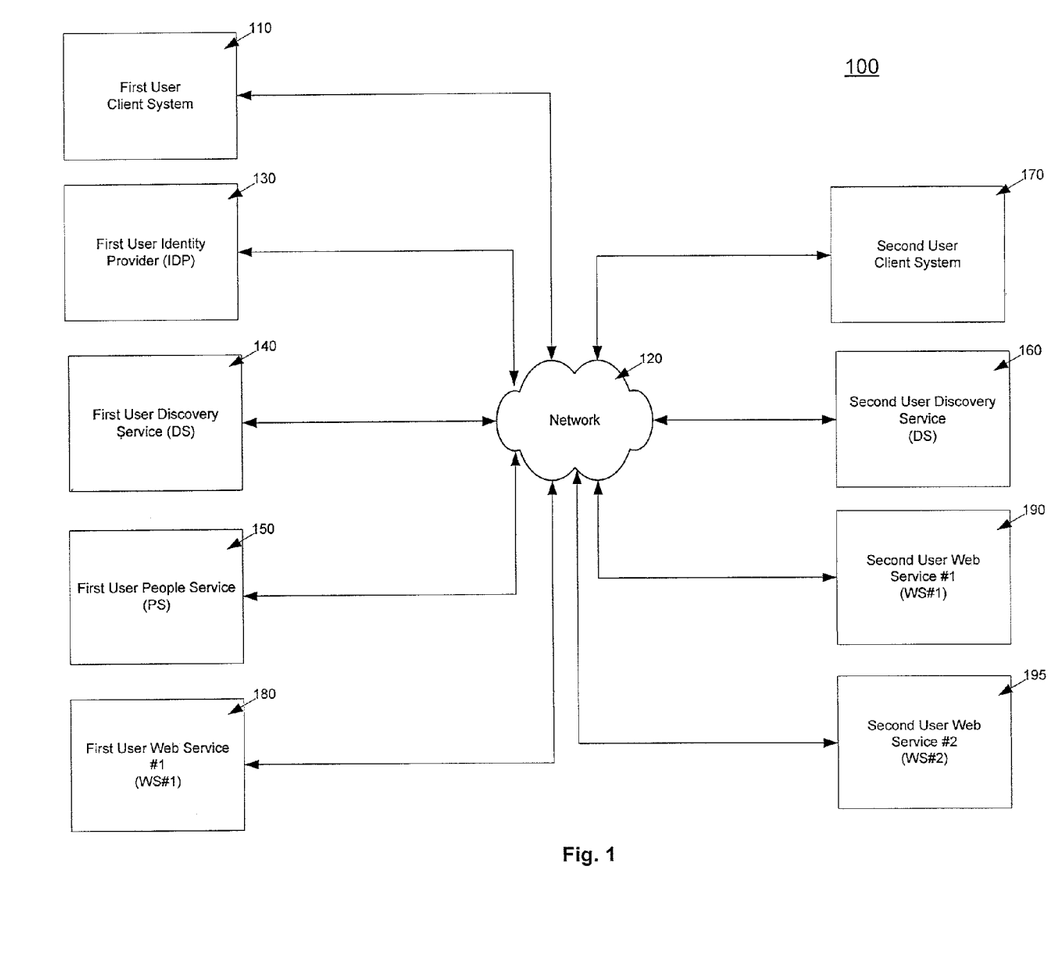
FIG. 1 is a block diagram of a communications system configured to enable a first user to securely and securely invoke a second user's electronic service.

FIG. 1 shows a communications system 100 configured to enable a first user to securely and securely invoke a second user's electronic service. The communication system 100 includes a first user client system 110, a first user identity provider (IDP) 130, a first user discovery service provider (DS) 140, a first user people service provider (PS) 150, and a first user web service provider #1 (WS#1) 180. The communication system 100 also includes a second user client system 170, a second user discovery service (DS) 160, a second user web service provider #1 (WS#1) 190, and a second user web service provider #2 (WS#2) 195. While FIG. 1 only shows one web service provider associated with the first user and two web service providers associated with the second user, no such limit is necessary as to the number of web service providers affiliated with each user. Moreover, while FIG. 1 only shows elements related to two users for illustrative purposes, additional users may be supported by expanding system 100 to include additional client systems and, in some implementations, additional discovery service providers, people service providers, and/or web service providers. The various elements of communications system 100 communicate with each other over network 120.

The first user client system 110 and the second user client system 170 are computer systems configured to enable a first user and a second user, respectively, to access electronic services across the network 120. The electronic services may include, for example, web services, including communication services, time management services, financial services, and business specific services, and security management services, including discovery services, identity provider services, and people services (discussed in more detail below). The first user client system 110 and the second user client system 170 include hardware and/or software components for communicating across the network 120. The client systems 110 and 170 each may include one or more general purpose computers (e.g., personal computers and/or servers), one or more special-purpose computers (e.g., devices specifically programmed to communicate with each other), or a combination of one or more general-purpose computers and one or more special-purpose computers. The client systems 110 and 170 may be structured and arranged to communicate using various communication protocols (e.g., HTTP or WAP) and encapsulation protocols (e.g., UDP) to establish connections (e.g., peer-to-peer) between network elements and/or to operate within or in concert with one or more other systems (e.g., the Internet and/or Web).

The network 120 may include one or more delivery systems for directly or indirectly connecting the first and second user client systems 110 and 170; the first user IDP 130; the first and second user DSs 140 and 160; the first user PS 150; the first and second user WS#1 180 and 190; and the second user WS#2 195. Examples of delivery systems include, but are not limited to, a local area network ("LAN"), a wide area network ("WAN"), the Internet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, routers, switches, adapters, and wired or wireless data pathways, configured to direct and/or deliver data.

The first user IDP 130 is a computer system configured to authenticate the first user and provide the first user client system 110 with security tokens and connection information for accessing electronic services. The first user IDP 130 authenticates the first user by, for example, prompting the first user for login information, such as a password and an identity associated with the first user, and determining the validity of the login information. If valid login information is received, the first user is authenticated and the first user IDP 130 provides the first user client system 110 with a security token and connection information for accessing the first user DS 140. The first user DS 140, as described below, is configured to provide the first user client system 110 with security tokens and connection information for accessing electronic services associated with the first user. Aside from providing the security token and connection information for accessing the first user DS 140, the first user IDP 130 also is configured to provide the first user client system 110 with security tokens and connection information to authenticate the first user and enable the first user to access electronic services associated with the second user, such as the second user DS 180, or the second user WS#1 190. The first user IDP 130 also may be configured to provide one or more other users with security tokens and connection information for accessing electronic services. In another implementation, the first user IDP 130 and the first user DS 140 are combined together into a single integrated system.

The first user IDP 130 may include one or more general purpose computers, one or more special purpose computers, or a combination of one or more of the above. The first user IDP 130 may be arranged to operate within or in concert with one or more other systems, such as, for example, one or more LANs (not shown) and/or one or more WANs (not shown).

The security tokens provided to the first user client system 110 by the first user IDP 130 and by the first user DS 140 (described in more detail below) allow the first user the convenience of only having to go through the authentication process once, rather than having to go through the authentication process each time the first user attempts to access a new electronic service. Once the first user has been authenticated by the first user IDP 130, all subsequent service authentication (typically for a limited period of time) is accomplished through use of security tokens received from either the first user IDP 130 or from the first user DS 140. A security token received from the first user IDP 130 or from the first user DS 140 may be sent as part of the header information of a service request or message to a service provider. If the security token is deemed acceptable by the service provider, the sender of the service request or message is considered authenticated.

A security token is typically considered acceptable if it is determined to be valid and if the token is used in a manner that meets a set of permissible use conditions or requirements. The security token is determined to be valid if the token is signed by a trusted issuing authority. The set of permissible use requirements for a token may include, for example, one or more of the following: a requirement that the token be sent during a designated time window or time period, a requirement that the token be sent from an identified authorized sender, a requirement that the token be sent to an identified authorized recipient, and a set of proof requirements that the sender must satisfy to prove that he or she is who he or she purports to be. The set of proof requirements may include, for example, a requirement that the sender sign a portion of the security token or a portion of the message that includes the security token with a private key that corresponds to a public key included in or associated with the security token. The set of requirements for permissible use of a security token may vary from token to token. For example, bearer tokens do not include proof requirements because the simple act of bearing or providing such a token is considered sufficient proof that the sender is who he/she/it purports to be. If any one of the permissible use requirements are not met, the security token is not acceptable.

The security tokens generated by the first user IDP 130 or by the first user DS 140 may include, for example, a SAML (Security Assertion Markup Language) assertion and may be transmitted in a WS-Security (Web Services Security) header attached to a message. The security token is typically, but not necessarily, signed and/or encrypted. Security tokens are specific to a user and are often specific to the service for which access is requested.

In addition to providing security tokens, the first user IDP 130 and the DS 140 are also configured to provide the first user client system 110 with connection information for electronic services. The connection information is information that enables the first user client system 110 to both locate the service across the network 120 and to connect to the service in accordance with that service's privacy and security requirements. The connection information may include, for example, the endpoint address of the service (e.g., the Internet Protocol address or the Universal Resource Locator) and the security mechanism used when communicating with that service (e.g., the Uniform Resource Name may describe that Transport Layer Security encryption is necessary).

The first user DS 140 is a computer system configured to provide security tokens as well as connection information for electronic services with which the first user is associated. The first user may be associated with an electronic service by, for example, being a subscriber to the electronic service, being registered with the electronic service, being allowed to independently access and avail himself or herself of at least one of the service features offered by the electronic service, and/or being otherwise included in a list of users authorized to independently access the electronic service. The first user DS 140 is referred to as a "Discovery Service" because it enables the first user to discover and access the electronic services associated with him or her. In another implementation, the first user DS 140 also is configured to provide identity tokens (see below) for the first user to other requesting users.

If the first user wishes to invoke or access one of the electronic services associated with him or her, the first user client system 110 sends a request to the first user DS 140 to access the specified first user electronic service (e.g., the first user WS#1 180 or the PS 160). The request sent to the first user DS 140 typically includes a security token provided to the first user client system 110 by the first user IDP 130 for accessing the first user DS 140. The first user DS 140 responds to the request by determining whether it includes an acceptable security token and, if the token is determined to be acceptable, by providing the first user client system 110 with a security token and connection information for accessing the specified first user electronic service. The first user client system 110 uses the provided security token and connection information to enable the first user to access the specified first user electronic service.

If the first user, however, wishes to invoke or access a specified service associated with the second user, the first user client system 110 sends a request to the first user DS 140 to access the PS 150. The first user DS 140 responds to the request by determining whether it includes an acceptable security token and, if the token is determined to be acceptable, by providing the first user client system 110 with a security token and connection information for accessing the PS 150. The first user client system 110 uses the provided security token and connection information to access and communicate with the PS 150. The first user client system 110 communicates with the PS 150, the first user IDP 130, and the second user DS 160 as described below with respect to FIGS. 3A-3C to obtain an identity token for the second user for the specified service and to obtain a security token for the first user for the specified service. As described below, the identity token and the security token are both used by the specified service to authenticate the requester and identify who's resources are being accessed.

The first user DS 140 may include one or more general purpose computers, one or more special purpose computers, or a combination of one or more of the above. The first user DS 140 may be arranged to operate within or in concert with one or more other systems, such as, for example, one or more LANs (not shown) and/or one or more WANs (not shown). In some implementations, the first user DS 140 and the first user IDP 130 are combined into a single integrated system.

The first user PS 150 is a computer system configured to store and provide access to identity tokens. An identity token is used to securely identify a third person (i.e., the second user) associated with resources for which access is being requested. The first user may request service from a service provider affiliated with a second user by sending a service request/message to the service provider that includes both a security token for the first user for the requested service and an identity token for the second user for the requested service. The service provider authenticates the first user by processing the security token to determine whether it is acceptable and securely identifies the second user by processing the identity token to determine whether it is acceptable. If both the security token and the identity token are deemed acceptable, the request is considered authentic by the service provider. The service provider then determines whether the first user is authorized to access the service by, for example, accessing a data record associated with the second user that stores a set of one or more user identities authorized by the second user to access the service (or service feature(s)). If the identity of the first user is among the set of one or more authorized user identities, the first user is authorized to access the service (or service feature(s)), and the service provider grants the first user access to the service (or service feature(s)). Additionally or alternatively, the data record associated with the second user may indicate that "anyone" is authorized to access the service (or service feature(s)). If the data record indicates that authorization to access the service should be provided to "anyone", the service provider grants the first user access to the service regardless of his or her identity.

Figure 2:
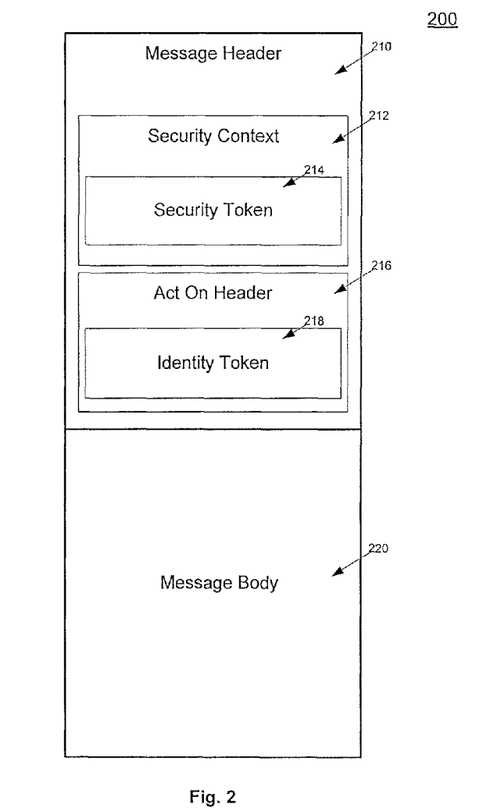
FIG. 2 is a block diagram illustrating an exemplary structure of a message that includes both a security token and an identity token.

Both an identity token and a security token may be placed in the header of the same message/service request sent to a service provider. The identity token is typically placed in its own portion of the header, referred to as the "act on" header (i.e., the sender of the message wants to "act on" the services of the user identified by the identity token), and the security token is typically, but not necessarily, placed in a different portion of the header. An exemplary message/service request structure is illustrated in FIG. 2 and discussed in detail below.

The identity token may include the service identifier of the second user as well as a bootstrap for accessing the discovery service of the second user. The service identifier of the second user is an identifier used by the service to identify the second user. The service identifier of the second user typically changes from service to service and also may change over time. Accordingly, an identity token is also typically specific to a given service and may only be valid for a limited period of time. The acceptability of identity tokens is determined in the same manner described above for security tokens (i.e., the identity token is deemed acceptable if determined to be valid and determined to meet a set of permissible use conditions). Identity tokens, like security tokens, also may be signed and/or encrypted.

The first user PS 150 is configured to provide an identity token for the second user in response to a request from the first user client system 110. Typically, the first user PS 150 receives a request from the first user client system 110 for an identity token of the second user for the second user DS 180. The request received by the first user PS 150 typically includes a security token provided to the client system 110 by the first user DS 140. The PS 150 determines whether the security token is acceptable, and, if the security token is deemed acceptable, accesses and sends the requested identity token to the first user client system 110. In another implementation, the first user PS 150 is configured to provide to other client systems identity tokens that may be used to access discovery services and/or other electronic services. The first user PS 150 may include one or more general purpose computers, one or more special purpose computers, or a combination of one or more of the above. The first user PS 150 may be arranged to operate within or in concert with one or more other systems, such as, for example, one or more LANs (not shown) and/or one or more WANs (not shown).

The second user DS 160 is a computer system configured to perform the same functions as the first user DS 140 but for the second user, rather than for the first user. In particular, the second user DS 160 is a computer system configured to provide security tokens as well as connection information for services with which the second user is associated. The second user DS 160, however, is also configured to provide identity tokens for the second user to third parties requesting to invoke or access the resources of the second user. In some implementations, the first user DS 140 is also configured to provide identity tokens for the first user to third parties requesting to invoke or access the resources of the first user.

The second user DS 160 is configured to receive a service request from the first user client system 110 requesting an identity token for the second user for a specific service (e.g., second user WS #1 190). The service request typically includes a security token for the first user and an identity token for the second user. The security token is often specific to the DS 160 and is typically provided to the first user client system 110 by the first user IDP 130. The identity token is often specific to the DS 160 and is typically provided to the first user client system 110 by the first user PS 150. The second user DS 160 determines whether both the received security token and the received identity tokens are acceptable. If both of the received tokens are acceptable, the second user DS 160 accesses and sends to the first user client system 110 the identity token for the second user for the specific service (e.g., second user WS#1 190).

The first user WS#1 180, the second user WS#1 190, and the second user WS#2 195 are computer systems configured to offer web-based services to users. In particular, the first user WS#1 180 is configured to offer web-based services to the first user, and the second user WS#1 190 and WS#2 195 are configured to offer web-based services to the second user. In another implementation, services 180, 190, and/or 195 are configured to offer electronic services to users, irrespective of whether the electronic services are web-based.

The services 180, 190, and 195 may offer services that include, for example, e-mail services, instant messaging services, calendar services, address book services, financial services, and other general or specialized electronic services. The services 180, 190 and 195 are configured to restrict access to the services to only those users registered with or otherwise authorized to access the services. The services may provide authorized users with access to all service features available for the service or, additionally or alternatively, may provide authorized users with access to only a subset of the available service features. For example, if the service is a calendar service, an ordinary subscriber may only be allowed to manually place text notes in his or her calendar entries, while a premium subscriber may be allowed to place audio, video, and text in the calendar entries and to setup macros to automatically send electronic notices via e-mail or via instant messaging to alert the subscriber of upcoming appointments.

The services 180, 190, and 195 are each configured to receive a service request from a user, authenticate the user, and determine whether the user is authorized to access an offered service or service feature(s). The services 180, 190, and 195 may receive service requests from users that are requesting to access their own resources or are requesting to access the resources of another user.

If the requesting user is requesting to access his or her own resources, the client system of the requesting user sends a service request that includes a security token for the requesting user to the service 180, 190, or 195. The service 180, 190, or 195 examines the security token included in the service request and determines whether the security token is acceptable. If the security token is determined to be acceptable, the user and the service request are deemed authentic, and the service 180, 190, or 195 then determines whether the user is authorized to access the service or service feature(s). The service 180, 190, or 195 may determine whether the user is so authorized by, for example, searching a registered user database for an identifier associated with the requesting user. If the requesting user is a registered user, the service request may be granted. Otherwise, the service request may be denied.

If the requesting user is requesting to access the resources of another user (i.e., a first user requesting access to the resources a second user), the requesting user sends to the service 180, 190, or 195 a service request that includes both a security token for the first user and an identity token for the second user. If both the security token and the identity token are determined to be acceptable, the first user and the service request are deemed authentic, and the service 180, 190, or 195 then determines whether the first user is authorized to access the service or service feature(s). The service 180, 190, or 195 may determine whether the first user is so authorized by, for example, searching a registered user database for an identifier associated with the second user. If the second user is a registered user, the service 180, 190, or 195 may access preferences associated with the second user to determine whether the second user has authorized the first user to access the service or service feature(s). If the first user has been authorized to access the service or service feature(s) by the second user, the service 180, 190, or 195 grants the first user access to the service or service feature(s). If the first user has not been authorized to access the service or service feature(s) by the second user, the service 180, 190, or 195 denies the first user access to the service or service feature(s).

In another implementation, the service 180, 190, or 195 determines whether the second user is an authorized user of the electronic service prior to determining if the security token and/or identity token are acceptable. If the second user is determined not to be an authorized user, the service request is denied without requiring the service 180, 190 or 195 to further examine the tokens.

In another implementation, the second user may define as part of his or her preferences, the level of access given to the first user when accessing or invoking the second user's service. For example, the second user may only allow the first user to access or invoke a subset of all of the service features offered by the electronic service or may only allow the first user to access or invoke the electronic service during a predetermined period of time specified by the second user. The second user also may only allow the first user to access or invoke the electronic service or service feature a predetermined number of times. For example, the service may comprise a pay-per-view service and the preferences of the second user my be set to enable denial of authorization to the first user if more than a predetermined number of requests to watch a video were received from the first user in the past.

In yet another implementation, the preferences associated with the second user are not defined by the second user. Rather, they are defined by a third party (e.g., a supervisor or a parent) for the second user.

FIG. 2 is a block diagram illustrating an exemplary structure of a message 200 that includes both a security token and an identity token. The message 200 includes a message header 210 and a message body 220. The message header 210 includes one or more of the following: information used to route the message (e.g., destination address information), information regarding the origin of the message (e.g., recipient address information and the date the message was generated and/or sent), information regarding the contents of the message body (e.g., the message size and/or data type), and information regarding how the message should be handled (e.g., security requirements). The message header 210 includes a security context 212 and an "act on" header 216.

The security context 212 is a portion of the header 210 that includes the security context or security environment for authenticating the message. The security context 212 includes a security token section 214 and any necessary proofs, conditions, or rules that must be satisfied for permissible use of the security token 214. The security context 212 may, for example, conform to the Web Services Security specification of the Organization for the Advancement of Structured Information Standards (OASIS WS-Security Standard) (www.oasis-open.org).

The security token section 214 may include the security token for the message sender (i.e., the first user) or, alternatively, if the security token is stored elsewhere in the message or stored externally, the security token section 214 may include a reference or a pointer to the security token. For example, if the security token is stored at an issuing authority, the security token section 214 may include an artifact that may be used by the message recipient to request the token from the issuing authority. The security token may be, for example, a Security Assertions Mark-up Language (SAML) assertion or a SAML authentication assertion issued by a SAML authority.

The act on header 216 is a container for the identity token 218 of a second user or third party. The header 216 is referred to as an "act on" header because its presence indicates that the message sender wants to "act on" the services of the user identified by the identity token 218 contained in the header 216. The identity token 218 is similar to a security token but is used to authenticate a second user/third party, rather than to authenticate the message sender. The identity token is also used to identify the second user/third party to the message recipient (i.e., to the electronic services provider). The identity token may be, for example, a SAML assertion. If the message 200 does not include an act on header 216, the message recipient (i.e., the electronic services provider) typically treats the message 200 as if the message sender is requesting to access his or her own resources (i.e., the sender wants to invoke or access his or her own service).

The message body 220 includes the message contents. Typically, the message recipient is an electronic services provider and the message body 220 includes a request for service. The request for service includes whatever data (e.g., parameters and identifiers) necessary for enabling the electronic services provider to both identify the message sender and provide the message sender with access to one or more of the service features offered by the provider.

Figure 3A:
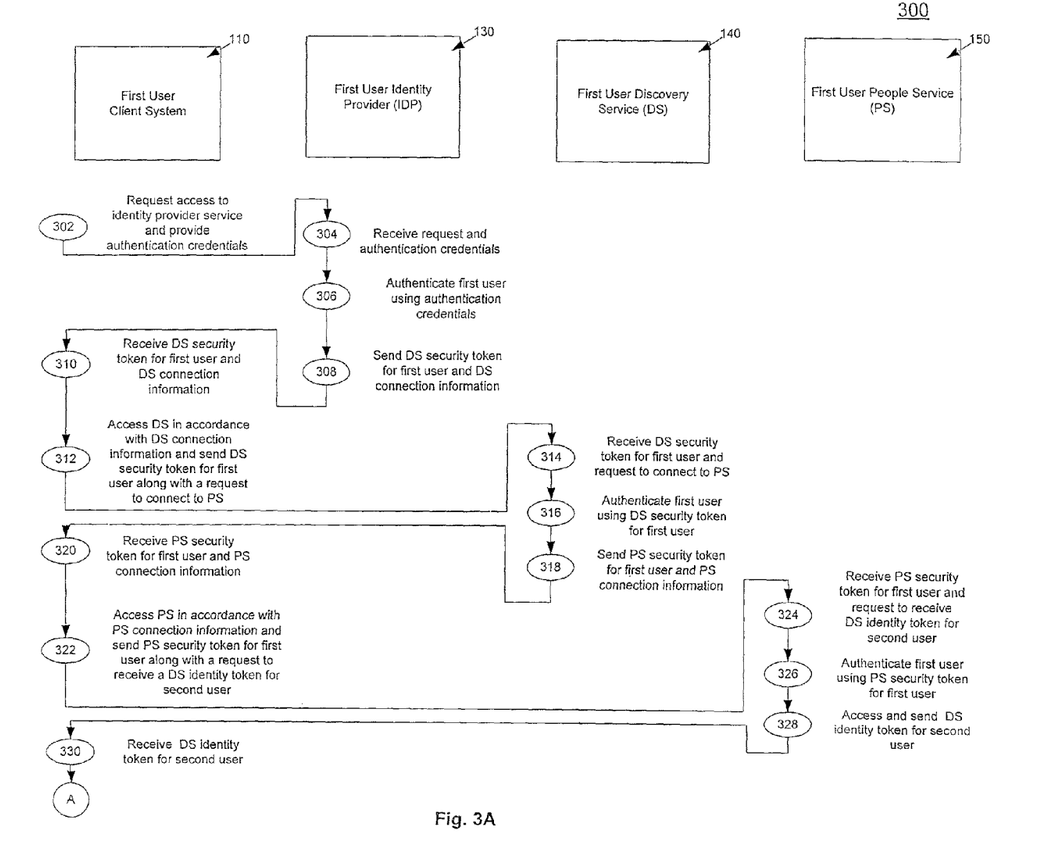
FIGS. 3A-3C are flow charts of a process for enabling a first user to invoke a second user's electronic service.
Figure 3B:
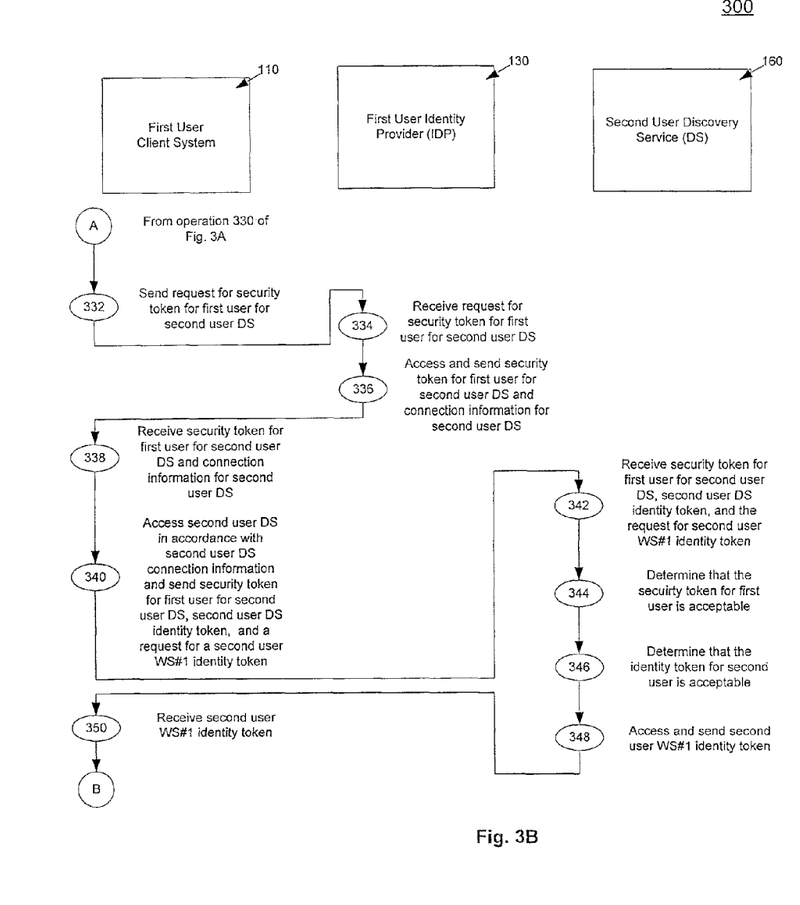
Figure 3C:
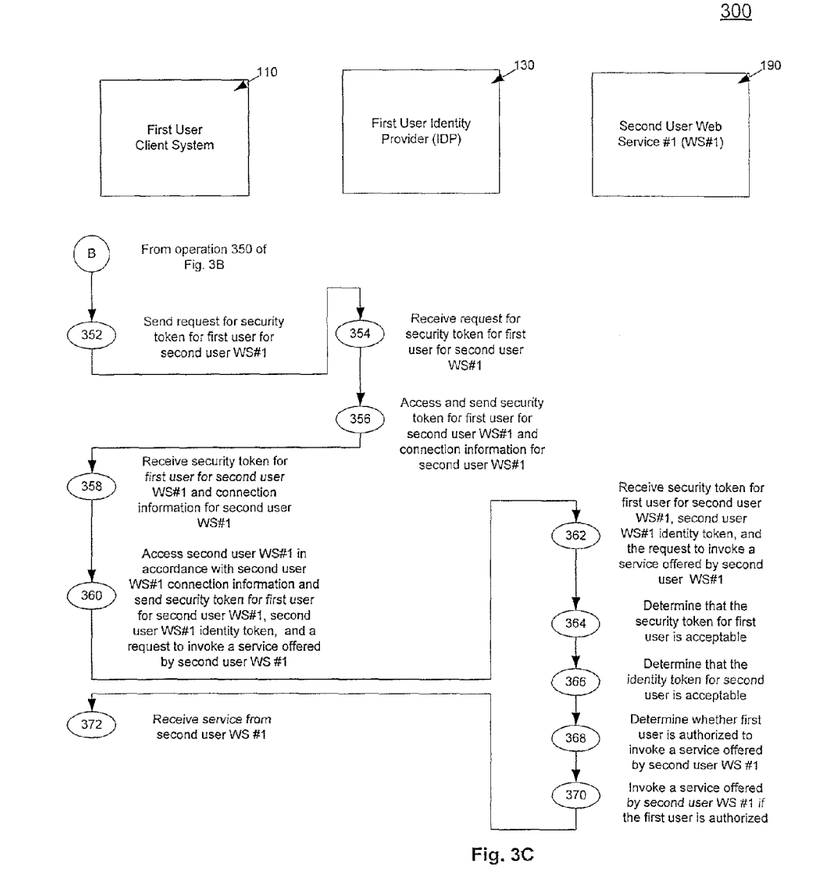

FIGS. 3A-3C show a process 300 for enabling a first user to invoke a second user's service. For convenience, particular components described with respect to FIG. 1 are referenced as performing the process 300. However, similar methodologies may be applied in other implementations where different components are used to define the structure of the system, or where the functionality is distributed differently among the components shown by FIG. 1.

The first user client system 110 enables the first user to request access to the first user IDP 130 (302). The first user typically provides authentication credentials, such as login information, to the first user IDP 130 along with the access request. The first user IDP 130 receives the request and the authentication credentials (304), authenticates the first user using the authentication credentials (306), and sends to the first user client system 110 a DS security token for the first user and connection information for connecting to the first user-DS 140 (308).

The first user client system 110 receives the DS connection information and the DS security token for the first user (310). The first user client system 110 then connects to the first user DS 140 in accordance with the DS connection information and submits a request to the first user DS 140 to access the PS 150 (312). The request includes the DS security token for the first user.

The first user DS 140 receives the request to access the PS 150 (314), and authenticates the first user using the DS security token (316). If the first user is successfully authenticated (i.e., the token is determined to be acceptable), the first user DS 140 sends to the first user client system 110 a PS security token for the first user and connection information for connecting to the PS 150 (assuming that the first user is authorized to receive the PS security token) (318). If the first user is not successfully authenticated, the request is denied (not shown).

The first user client system 110 receives the PS security token for the first user and the PS connection information (320), and connects to the first user PS 150 in accordance with the PS connection information (322). The first user client system 110 sends to the first user PS 150 a service request for an identity token for the second user for accessing the second user DS 160 (hereinafter referred to as "a DS identity token for the second user") (322). The service request includes the PS security token for the first user. Because most identity tokens include a DS bootstrap, the DS identity token for the second user may be any identity token for the second user that has a DS bootstrap.

The first user PS 150 receives the service request for a DS identity token for the second user (324) and authenticates the first user using the PS security token (326). If the first user is successfully authenticated (i.e., the token is determined to be acceptable), the PS 150 sends to the first user client system 110 a DS identity token, for the second user (assuming that the first user is authorized to receive the DS identity token) (328). If the first user is not successfully authenticated, the request is denied (not shown).

The first user client system 110 receives the DS identity token for the second user (330), and submits to the first user IDP 130 a request for a security token for the first user for accessing the second user DS 160 (332). The first user IDP 130 receives the request (334). The first user IDP 130 then processes the request, and accesses and sends to the first user client system 110 a security token for the first user to access the second user DS 160, and sends connection information for connecting to the second user DS 160 (336).

The first user client system 110 receives the security token for the first user to access the second user DS 160 and the second user DS connection information (338), and connects to the second user DS 160 in accordance with the second user DS connection information (340). The first user client system 110 sends to the second user DS 160 a service request for a second user WS #1 identity token for the second user (340). The service request includes the security token for the first user to access the second user DS 160 and the DS identity token for the second user.

The second user DS 160 receives the service request for the second user WS#1 identity token (342) and authenticates the first user by examining the security token for the first user (344). The second user DS 160 also authenticates the second user by examining the DS identity token for the second user (346). If both users are successfully authenticated (i.e., the identity token and the security token are both determined to be acceptable), the DS 160 sends to the first user client system 110 a WS#1 identity token for the second user (assuming that the first user is authorized to receive the WS#1 identity token) (348). If one or both of the users are not successfully authenticated, the request is denied (not shown).

The first user client system 110 receives the second user WS#1 identity token for the second user (350), and submits to the first user IDP 130 a request for a security token for the first user for access to the second user WS#1 190 (352). The first user IDP 130 receives the request (354). The first user IDP 130 then processes the request, and accesses and sends to the first user client system 110 a security token for the first user for the second user WS#1 190 and connection information for connecting to the second user WS#1 190 (356).

The first user client system 110 receives the security token for the first user for the second user WS#1 190 and the second user WS#1 connection information (358) and connects to the second user WS#1 190 in accordance with the second user WS#1 connection information (360). The first user client system 110 sends to the second user WS#1 190 a request to invoke or access a service offered by the second user WS#1 190 (360). The request includes the security token for the first user to access the second user WS#1 190 and the WS#1 identity token for the second user.

The second user WS#1 190 receives the service request (362) and authenticates the first user by examining the security token for the first user (364). The second user WS#1 190 also authenticates the second user by examining the WS#1 identity token for the second user (366). If both users are successfully authenticated (i.e., the identity token and the security token are both determined to be acceptable), the second user WS#1 190 determines whether the first user is authorized to invoke a service offered by the second user WS#1 (368). If the first user is not authorized, the second user WS#1 190 denies the service request (not shown). If the first user is authorized, the second user WS#1 190 processes the request and enables the first user to access the requested service or service feature (370 and 372). If one or both of the users is not successfully authenticated, the request is denied (not shown).

A number of implementations of the invention have been described. It will be understood, however, that various modifications may be made without departing from the spirit and scope of the claims. For example, while the systems and techniques refer to enabling a first user to invoke a second user's service, the same systems and techniques may be used to enable a first entity (e.g., a computer) to invoke a second entity's service. In this implementation, entity identifiers (e.g., computer identifiers) may replace some or all of the user identifiers.

In another implementation, one or more of the operations of process 300 in which data, messages, and/or service requests are sent to and received from various system elements may be replaced by operations that enable access, rather than send, and operations that access, rather than receive, the data, messages, and/or service requests.

In another implementation, prior to sending an identity token for a second user related to an electronic service, the people service or discovery service first determines whether the first user has been authorized to receive the identity token. If the first user has not been authorized to receive the identity token, then the people service or discovery service does not provide the identity token to the first user client system 110 and the first user client system 110 is not able to submit a corresponding service request to an electronic service provider.

In another implementation, an electronic service that is associated with the second user is not associated with the first user. For example, the second user may have access his or her own resources at the electronic service provider while the first user is not able to access resources at the electronic service provider. In accordance with the described systems and techniques, the first user, however, may access the resources of the second user at the electronic service provider.

Accordingly, other implementations are within the scope of the following claims.

What is claimed is:

1. A method for invoking a computer-implemented service on a computer system including at least one processor, the method comprising:
   receiving a request from a delegate user to invoke a service on behalf of a managing user authorized to invoke the service, the managing user different than the delegate user, the request including a security token specific to the delegate user and including at least one of an identity token specific to the managing user and a pointer to the identity token specific to the managing user;
   authenticating, via the at least one processor, the delegate user based on the security token;
   identifying one or more service features of the service that the delegate user is authorized to invoke on behalf of the managing user based on the identity token and the security token; and
   enabling the delegate user to invoke the identified one or more service features on behalf of the managing user.

2. The method of claim 1, wherein the delegate user is not a registered user of the service.

3. The method of claim 1, wherein receiving the request from the delegate user comprises receiving a message from the delegate user that includes a header portion comprising the identity token.

4. The method of claim 3, wherein the header portion additionally includes the security token or a pointer to the security token.

5. The method of claim 4, wherein the security token or the pointer to the security token is contained in a security context in the header portion.

6. The method of claim 5, wherein the security context comprises a Web Services Security (WS-Security) context.

7. The method of claim 1, wherein the one or more service features that the delegate user is authorized to invoke on behalf of the managing user are identified according to one or more rules for permissible use of the security token.

8. The method of claim 1, wherein the security token comprises a Security Assertions Mark-up Language (SAML) assertion or a SAML authentication assertion.

9. A non-transitory computer-readable medium comprising instructions that are executed by at least one processor to cause the at least one processor to perform steps comprising:
   receiving a request from a delegate user to invoke a service on behalf of a managing user authorized to invoke the service, the managing user different than the delegate user, the request including a security token specific to the delegate user and including at least one of an identity token specific to the managing user and a pointer to the identity token specific to the managing user;
   authenticating the delegate user based on the security token;

identifying one or more service features of the service that the delegate user is authorized to invoke on behalf of the managing user based on the identity token and the security token; and enabling the delegate user to invoke the identified one or more service features on behalf of the managing user.

10. The non-transitory computer-readable medium of claim 9, wherein the delegate user is not a registered user of the service.

11. The non-transitory computer-readable medium of claim 9, wherein receiving the request from the delegate user comprises receiving a message from the delegate user that includes a header portion comprising the identity token.

12. The non-transitory computer-readable medium of claim 11, wherein the header portion additionally includes the security token or a pointer to the security token.

13. The non-transitory computer-readable medium of claim 12, wherein the security token or the pointer to the security token is contained in a security context in the header portion.

14. The non-transitory computer-readable medium of claim 13, wherein the security context comprises a Web Services Security (WS-Security) context.

15. The non-transitory computer-readable medium of claim 9, wherein the one or more service features that the delegate user is authorized to invoke on behalf of the managing user are identified according to one or more rules for permissible use of the security token.

16. The non-transitory computer-readable medium of claim 9, wherein the security token comprises a Security Assertions Mark-up Language (SAML) assertion or a SAML authentication assertion.

17. The method of claim 1, further comprising:
determining the acceptability of the identity token based on the validity of the identity token and one or more rules for permissible use of the identity token.

18. The non-transitory computer-readable medium of claim 9, further comprising instructions for:
determining the acceptability of the identity token based on the validity of the identity token and one or more rules for permissible use of the identity token.

* * * * *